(12) United States Patent
Park et al.

(10) Patent No.: US 9,381,650 B2
(45) Date of Patent: Jul. 5, 2016

(54) HANDLING APPARATUS FOR MOVING PART

(71) Applicant: Hyundai Motor Company, Seoul (KR)

(72) Inventors: Sangkyu Park, Seongnam-si (KR); Dooil Hwang, Montgomery, AL (US)

(73) Assignee: Hyundai Motor Company, Seoul (KR)

( * ) Notice: Subject to any disclaimer, the term of this patent is extended or adjusted under 35 U.S.C. 154(b) by 2 days.

(21) Appl. No.: 14/487,986

(22) Filed: Sep. 16, 2014

(65) Prior Publication Data

US 2015/0183116 A1    Jul. 2, 2015

(30) Foreign Application Priority Data

Dec. 31, 2013    (KR) .................. 10-2013-0168968

(51) Int. Cl.
*B66C 1/04*    (2006.01)
*B25J 15/06*    (2006.01)
*B25J 19/00*    (2006.01)

(52) U.S. Cl.
CPC .......... *B25J 15/0608* (2013.01); *B25J 19/0091* (2013.01)

(58) Field of Classification Search
CPC .............. B25J 15/0608; B25J 19/0091
USPC ............... 294/65.5, 183–189, 64.2–64.3, 65; 901/40
See application file for complete search history.

(56) References Cited

U.S. PATENT DOCUMENTS

| | | | | |
|---|---|---|---|---|
| 2,615,746 A * | 10/1952 | Fischer | ................ | B65B 69/00 221/212 |
| 3,079,191 A * | 2/1963 | Engelsted | ............. | H01F 7/0257 269/8 |
| 3,250,962 A * | 5/1966 | Palme | ................ | H01F 7/0257 294/65.5 |
| 3,297,352 A * | 1/1967 | Larrison | ............... | H01F 7/0257 294/65.5 |
| 3,975,813 A * | 8/1976 | Bell | .................. | E04F 13/088 29/270 |
| 4,121,865 A * | 10/1978 | Littwin, Sr. | ........... | B66C 1/0218 294/186 |
| 4,828,304 A * | 5/1989 | No | ...................... | B25J 15/0616 294/106 |
| 4,979,286 A * | 12/1990 | Nakayama | ......... | H05K 13/0413 29/740 |
| 5,975,837 A * | 11/1999 | Focke | ................... | B65G 47/90 294/119.1 |
| 6,022,187 A * | 2/2000 | Focke | ................... | B65G 47/91 294/183 |
| 6,168,221 B1 * | 1/2001 | Carruth | .................... | B25B 9/00 294/198 |
| 6,224,121 B1 * | 5/2001 | Laubach | ................ | B25J 15/04 294/183 |
| 6,364,387 B1 * | 4/2002 | Bolotin | ............. | H05K 13/0413 29/743 |
| 2001/0046435 A1 * | 11/2001 | Gibbel | .................. | B65G 59/04 414/795.5 |
| 2014/0375072 A1 * | 12/2014 | Cho | .................... | B25J 15/0061 294/188 |
| 2015/0151435 A1 * | 6/2015 | Chen | ................... | B25J 15/0616 294/188 |

FOREIGN PATENT DOCUMENTS

| | | | | |
|---|---|---|---|---|
| DE | 3021357 A1 * | 2/1982 | ........... | B25J 15/0608 |
| FR | 2668084 A1 * | 4/1992 | ............. | B21D 43/18 |
| JP | 2002-156214 A | 5/2002 | | |
| JP | 4668454 B2 | 4/2011 | | |
| KR | 10-2005-0087331 A | 8/2005 | | |
| KR | 10-2006-0020206 A | 3/2006 | | |

* cited by examiner

*Primary Examiner* — Gabriela Puig
(74) *Attorney, Agent, or Firm* — Morgan, Lewis & Bockius LLP

(57) ABSTRACT

A handling apparatus for a moving part may include a frame connected with a separate carrying unit, an electromagnet unit disposed ahead of the frame and coming in contact with the moving part, and a damping unit disposed between the frame and the electromagnet unit and absorbing shock due to contact with the moving part. The handling apparatus may further include a sliding unit disposed between the frame and the electromagnet unit. The damping unit may be disposed on the sliding unit.

17 Claims, 6 Drawing Sheets

HANDLING APPARATUS FOR MOVING PART

CROSS-REFERENCE TO RELATED APPLICATION

The present application claims priority of Korean Patent Application Number 10-2013-0168968 filed on Dec. 31, 2013, the entire contents of which application are incorporated herein for all purposes by this reference.

BACKGROUND OF INVENTION

1. Field of Invention

The present invention relates to a handling apparatus for a moving part. More particularly, the present invention relates to a handling apparatus for a moving part which handles a gap/step of moving parts such as the doors, the hood, and the trunk of a vehicle.

2. Description of Related Art

In general, moving parts such as doors, a hood, and a trunk are mounted on a vehicle and they necessarily have a gap/step. The gap/step is usually generated particularly between the front door and the rear door and has influence on the external appearance of vehicles. Accordingly, it is required to measure and manage a gap/step in the vehicle body line.

However, since there is no striker and latch in the vehicle line, the closed conditions of moving parts are different from those of a finished vehicle. Accordingly, handling apparatuses using a vacuum cup and a magnet have been developed.

In those handling apparatuses, however, a handling apparatus using a vacuum cup uses a pneumatic system, so the structure is complicated and maintenance is difficult. Further, a handling apparatus using a magnet causes a problem of magnetization and external dents. Further, since there is a need of a process of measuring a gap/step after handling by the handling apparatuses, it is difficult to reduce the process cycle time.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a handling apparatus for a moving part having advantages of handling a gap/step, using an electromagnet, and of absorbing shock a moving part and the apparatus, using a damping unit, when handling a moving part. Further, the present invention provides a handling apparatus for a moving part having advantages of removing a specific process of measuring a gap/step, by handling a moving part.

Various aspects of the present invention provide a handling apparatus for a moving part, which includes: a frame connected with a separate carrying unit; an electromagnet unit disposed ahead of the frame and coming in contact with the moving part; and a damping unit disposed between the frame and the electromagnet unit and absorbing shock due to contact with the moving part. The handling apparatus may further include a sliding unit that may be disposed between the frame and the electromagnet unit, wherein the damping unit may be disposed on the sliding unit.

The electromagnet unit may include: a mounting bracket having an electromagnet; a base mounted with the mounting bracket and connected with the sliding unit; and a rotating unit disposed on both sides of the base and connected with the base to enable the mounting bracket to rotate. The electromagnet may have a shock-absorbing member around an outer side of the electromagnet. The rotating unit may include housings disposed on both sides of the base and each mounted with a bearing therein, and rotating mounters with each respective rotating mounter having one side coupled to the mounting bracket and the other side coupled to the bearing of a corresponding housing.

The sliding unit may include: a first shaft that has one end fitted in the frame and the other end coupled to a first coupling portion formed on the base; and a second shaft that is spaced apart from the first shaft and has one end fitted in the frame and the other end coupled to a second coupling portion formed on the base. The first and second shafts may be fitted in the frame through linear ball bearings. The first and second shafts may be rotatably hinged to the first and second coupling portions formed on the base. The second coupling portion may be formed at a center portion of the base. The second shaft may have a slot formed at the other end coupled to the second coupling portion and may be hinged to the second coupling portion through the slot.

The damping unit may include: a first spring disposed on the first shaft of the sliding unit; and a second spring disposed on the second shaft of the sliding unit. The first and second springs may be held around the first and second shafts, respectively, by upper and lower spring seats. The first and second springs may have different spring constants.

The electromagnet unit may be declined toward the first shaft.

According to the present invention, it is possible to handle gaps/steps, using an electromagnet, and absorb shock between a moving part and the apparatus, using a damping unit, when handling a moving part, such that it is possible to prevent a dent in working. Further, according to the present invention, since an electromagnet is used, the structure is simple, the manufacturing is easy, and maintenance is simplified, as compared with using a pneumatic system that has been used in the related art. Further, according to the present invention, it is possible to eliminate a specific process of removing a gap/step through handling of a moving part, and it is possible to reduce the process cycle time.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
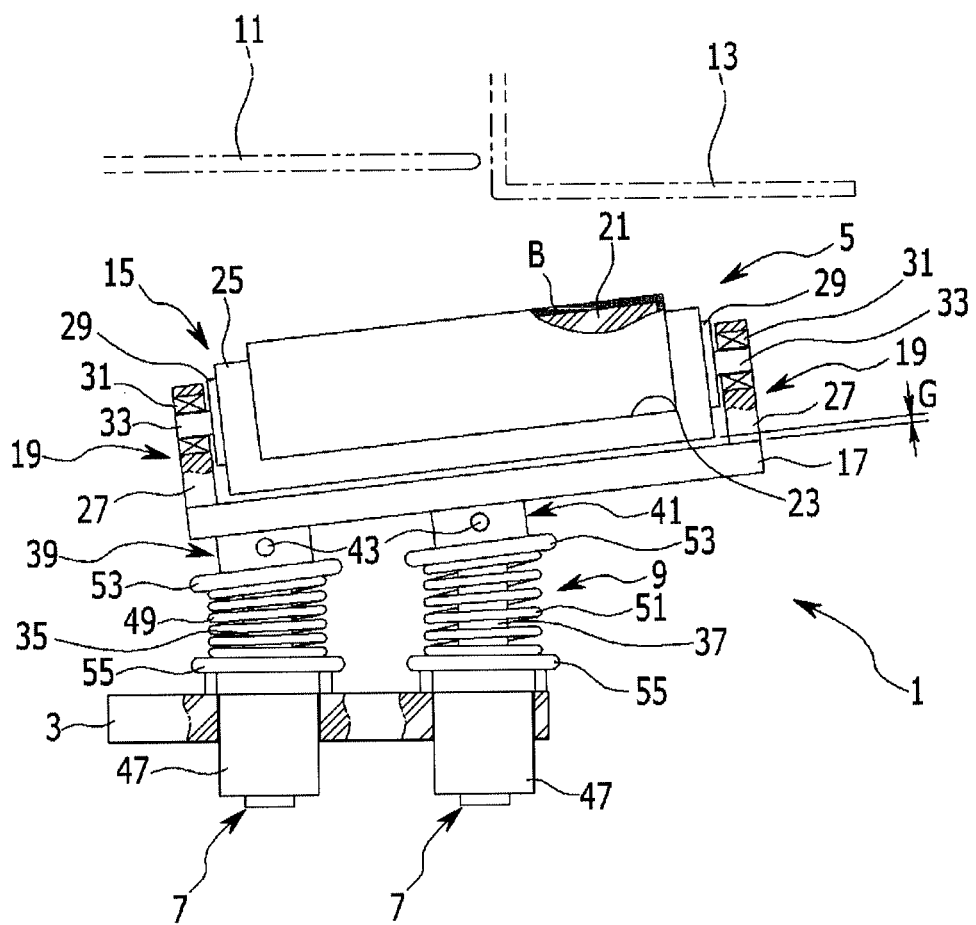
FIG. 1 is a schematic diagram of an exemplary handling apparatus for a moving part according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The sizes and thicknesses of the configurations shown in the drawings are provided for the convenience of description, the present invention is not limited to those shown in the drawings and in some cases, the thicknesses are exaggerated to make some parts and regions clear. The unrelated parts are not stated or illustrated to make the description of exemplary embodiments of the present invention clear, and the terms "first" and "second" etc. in the following description are for discriminating the parts with the same names, and the parts are not limited to the order.

In description of the present invention, a handling apparatus for a moving part according to various embodiments of the present invention handles a gap/step with an electromagnet when handling a moving part of a vehicle and absorbs shock generated between the moving part and the apparatus with a damping unit. Further, in description of various embodiments of the present invention, the moving part means a part that is movable such as a trunk, a hood, and a door. By way of illustration, the moving parts described hereafter are a front door and a rear door of a vehicle to help understand the description.

FIG. 1 is a schematic diagram of a handling apparatus for a moving part according to various embodiments of the present invention. Referring to FIG. 1, a handling apparatus 1 for a moving part according to various embodiments of the present invention includes a frame 3, an electromagnet unit 5, a sliding unit 7, and a damping unit 9.

The frame 3 is connected with a separate carrying unit that carries the handling apparatus 1 according to various embodiments of the present invention to a front door 11 and a rear door 13. The carrying unit may be an industrial robot or a multi-axis carrying unit, having a common configuration, so the detailed description and drawings are not provided.

The electromagnet unit 5 is disposed ahead of the frame 3 and brought in direct contact with the front and rear doors 11 and 13. The sliding unit 7 is disposed between the frame 3 and the electromagnet unit 5 and guides the electromagnet unit 5 to move it forward/backward. The damping unit 9 is disposed on the sliding unit 7 and absorbs shock that is generated when the electromagnet unit 5 comes in contact with the front and rear doors 11 and 13.

More detailed configurations of the electromagnet unit 5, the sliding unit 7, and the damping unit 9 are described hereafter. First, the electromagnet unit 5 includes a mounting bracket 15, a base 17, and a rotating unit 19.

The mounting bracket 15 has a seat 23 where an electromagnet 21 is seated and support walls 25 extending in one direction from both sides of the seat 23 and supporting both sides of the electromagnet 21. The electromagnet 21 has a shock-absorbing member B around the outer side, so it can prevent direct contact between the electromagnet 21 and the front and rear doors 11 and 13.

The base 17 makes a predetermined gap G from the seat 23 of the mounting bracket 15, has the rotating units 19 on its both sides, and is connected to the support walls 25 of the mounting bracket 15 through the rotating units 19. The rotating units 19 are disposed on the base 17 to enable the mounting bracket 15 to rotate and each include a housing 27 and a rotary mounter 29.

The housings 27 are disposed on both sides of the base 17, corresponding to the support walls 25, and where a bearing 31 is mounted. The rotary mounter 29 is disposed between the support wall 25 and the housing 27. That is, the rotary mounter 29 has one side fixed to the support wall 25 and is combined with the bearing 31 through a rotary shaft 33 formed at the other side.

Accordingly, the electromagnet unit 5 can follow the curved surfaces of the front and rear doors 11 and 13 while rotating as much as the gap G between the seat 23 and the base 17, when the electromagnet 21 is brought in contact with the front and rear doors 11 and 13 by the rotating units 19.

Figure 2:
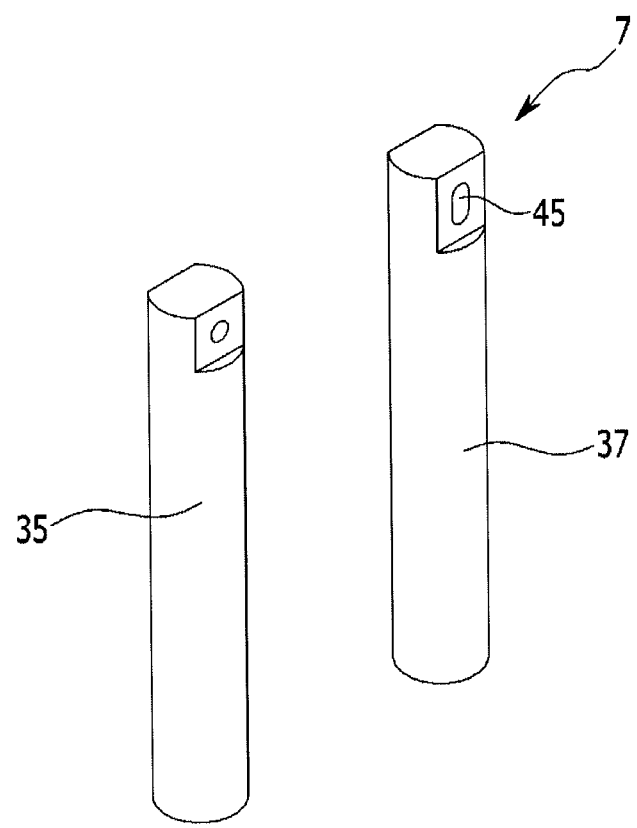
FIG. 2 is a perspective view of first and second shafts of an exemplary handling apparatus for a moving part according to the present invention.

FIG. 2 is a perspective view of first and second shafts of the handling apparatus for a moving part according to various embodiments of the present invention. Referring to FIG. 2 with FIG. 1, the sliding unit 7 includes a first shaft 35 and a second shaft 37.

The first shaft 35 has one end fitted in the frame 3 and the other end coupled to a first coupling portion 39 protruding on the base 17 toward the frame 3. The second shaft 37, which is spaced apart from the first shaft 35, has one end fitted in the frame 3 and the other end coupled to a second coupling portion 41 protruding on the base 17 toward the frame 3.

The first and second shafts 35 and 37 may be rotatably hinged to the first and second coupling portions 39 and 41, in which the second shaft 37 may be hinged to the second coupling portion 41 by means of a slot 45 longitudinally formed at the end that is coupled to the second coupling portion 41. The first and second shafts 35 and 37 are fitted each through a linear ball bearing 47 mounted on the frame 3.

Accordingly, the first and second shafts 35 and 37 can move straight up/down and can rotate at predetermined angles by means of the first and second coupling portions 39 and 41. In particular, the second shaft 37 can easily rotate through the slot 45 and the slot 45 may be curved.

The linear ball bearing 47 may be the same or similar to those in the art, so the detailed description is not provided.

The second coupling portion 41 may be formed at the center or center portion of the base 17 of the electromagnet unit 5. And the first coupling portion 39 is adjacent to the rotating unit 19 on one side of the base 17. That is, the second shaft 37 may be coupled to the center of the base 17 and the first shaft 35 may be coupled to one side of the base 17. Therefore, the opposite portion, where the first coupling portion 39 is formed, of the rotating unit 19 can rotate.

On the other hand, the damping unit 9 includes a first spring 49 and a second spring 51. The first spring 49 is disposed on the first shaft 35 of the sliding unit 7 and the second spring 51 is disposed on the second shaft 37 of the sliding unit 7. The first and second springs 49 and 51 are held around the first and second shafts 35 and 37, by upper and lower spring seats 53 and 55 on the first and second shafts 35 and 37, and they may have different spring constants.

That is, the first spring 49 may have a larger spring constant than the second spring 51. Accordingly, the center of the base 17, where the second shaft 37 is coupled through the second coupling portion 41, may be disposed higher than that of the first shaft 35. As a result, the electromagnet unit 5 may be declined toward the first shaft 35 and the second spring 51 may be pressed always first when the electromagnet unit 5 is brought in contact with the front and rear doors 11 and 13.

Figure 6:
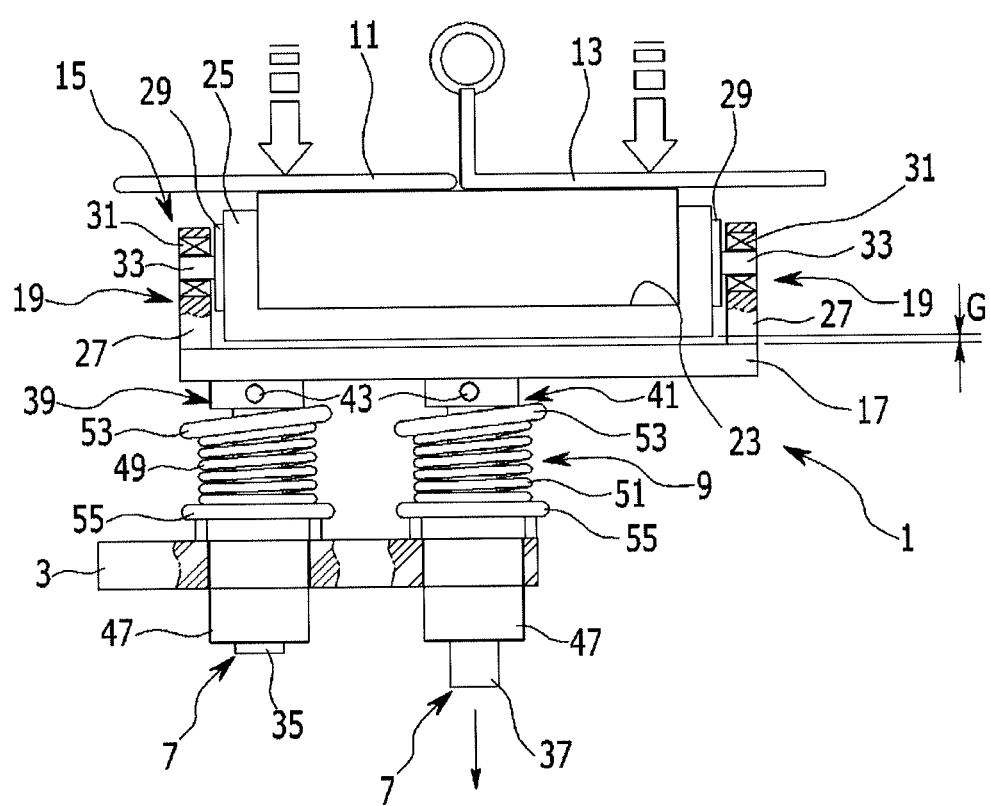

Hereinafter, the operation of the handling apparatus 1 for a moving part which has the configuration described above or the like is described with reference to FIGS. 3 and 6.

Figure 3:
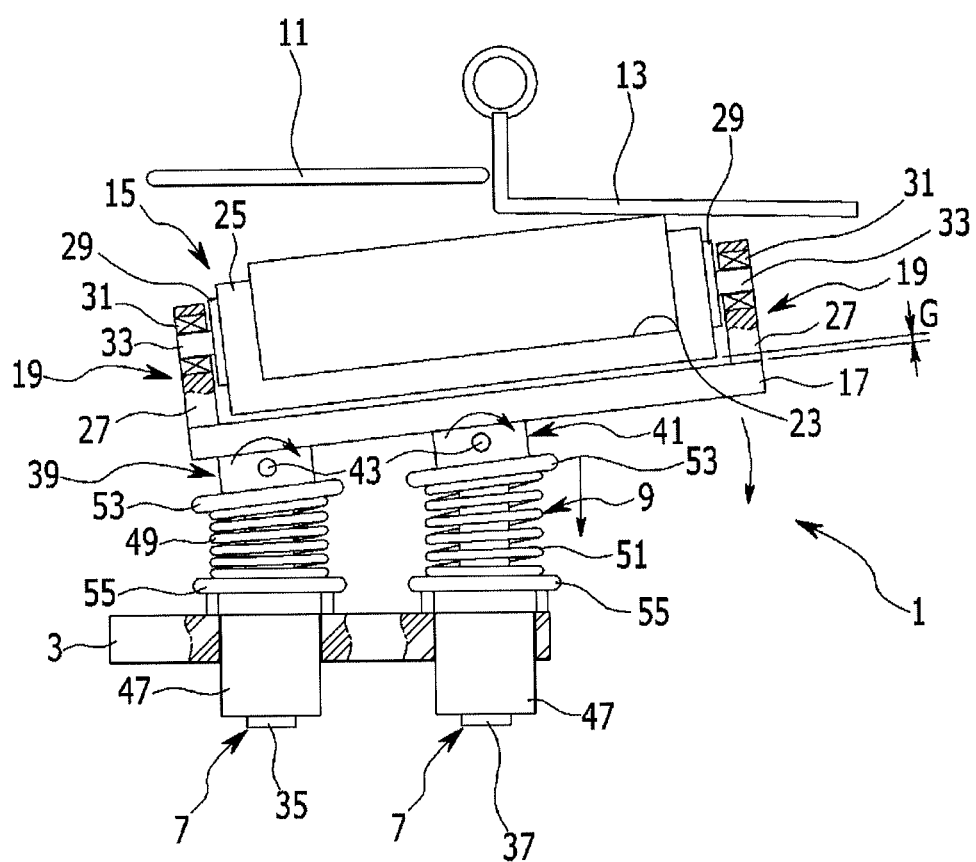
FIGS. 3 to 6 are views showing the operation of an exemplary handling apparatus for a moving part according to the present invention.

FIGS. 3 to 6 are views showing the operation of the handling apparatus for a moving part according to various embodiments of the present invention. Referring to FIG. 3, first, the handling apparatus 1 for a moving part is moved to the front and rear doors 11 and 13 with a gap/step by the carrying unit to handle the a gap/step of the doors, in which one side of the electromagnet 21 of the electromagnet unit 19 comes first in contact with the protruding rear door 13.

Figure 4:
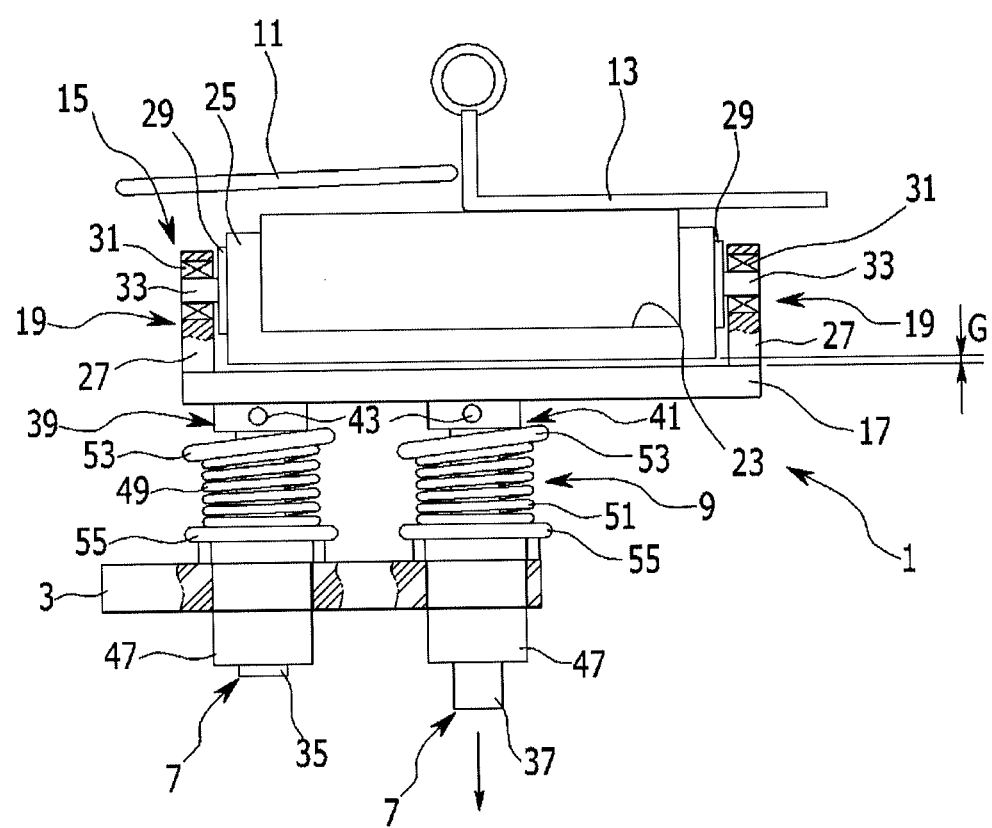

Thereafter, referring to FIG. 4, the second spring 51 of the damping unit 9 is compressed and the second shaft 37 is pushed in the opposite direction to the movement direction of the handling apparatus 1 for a moving part, by the movement of the handling apparatus 1 for a moving part. Shock caused by contact of the electromagnet 21 and the rear door 13 can be absorbed and attenuated by the first and second springs 49 and 51 and a dent on the rear door 13 can be prevented.

Figure 5:
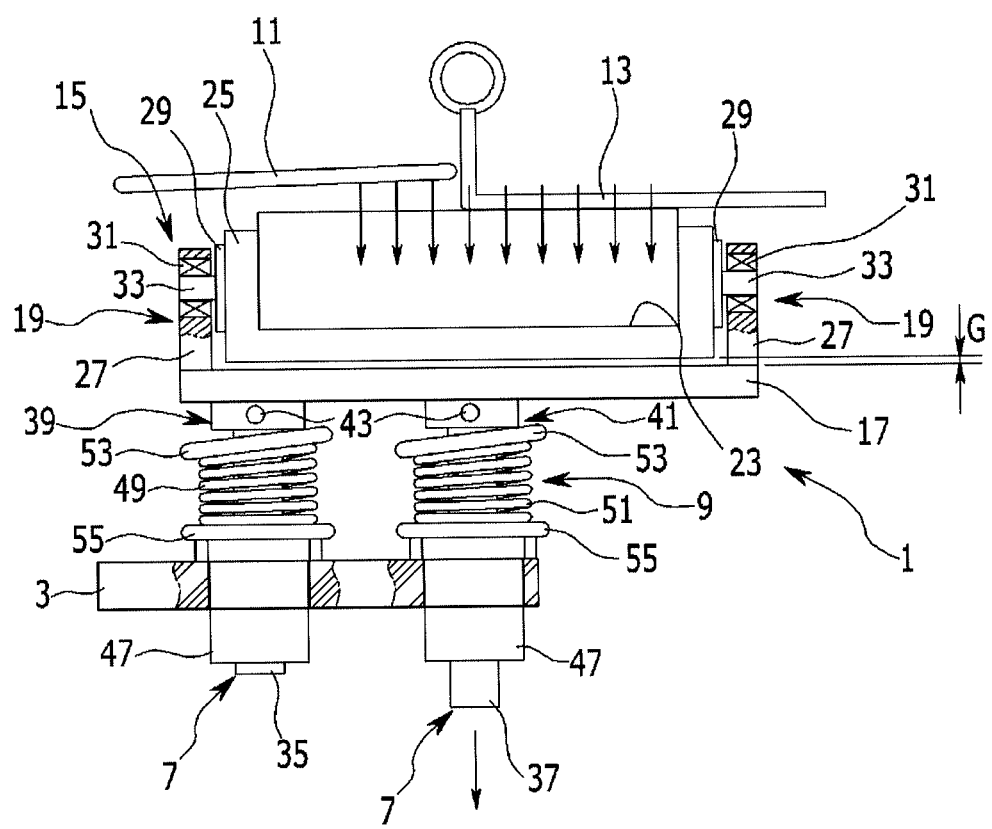

Further, the electromagnet unit 19 rotates about the hinges 43 where the first and second shafts 35 and 37 are coupled, so the entire apparatus becomes horizontal. Referring to FIGS. 5 and 6, as the electromagnet 21 is activated, a magnetic force is generated in the direction of an arrow and pulls the front door 11 to eliminate a gap/step, as illustrated in FIG. 6.

Accordingly, the gap/step between the front and rear door 11 and 13 can be removed, the shock force generated in this process can be absorbed and attenuated by the damping unit, and a dent on the front door 11 can be prevented, as in the rear door 13. By this process, a specific process of measuring a gap/step is not required and can be eliminated in the present invention.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A handling apparatus for a moving part, comprising:
 a frame connected with a separate carrying unit;
 an electromagnet unit disposed ahead of the frame and coming in contact with the moving part;
 a damping unit disposed between the frame and the electromagnet unit and absorbing shock due to contact with the moving part; and
 a sliding unit disposed between the frame and the electromagnet unit, wherein the damping unit is disposed on the sliding unit,
 wherein the electromagnet unit includes:
  a mounting bracket having an electromagnet;
  a base mounted with the mounting bracket and connected with the sliding unit; and
  a rotating unit disposed on both sides of the base and connected with the base to enable the mounting bracket to rotate.

2. The handling apparatus of claim 1, wherein the electromagnet has a shock-absorbing member around an outer side of the electromagnet.

3. The handling apparatus of claim 1, wherein the rotating unit includes:
 housings disposed on both sides of the base and each mounted with a bearing therein, and
 rotating mounters, each respective rotating mounter having one side coupled to the mounting bracket and the other side coupled to the bearing of a corresponding housing.

4. The handling apparatus of claim 1, wherein the sliding unit includes:
 a first shaft that has one end fitted in the frame and the other end coupled to a first coupling portion formed on the base; and
 a second shaft that is spaced apart from the first shaft and has one end fitted in the frame and the other end coupled to a second coupling portion formed on the base.

5. The handling apparatus of claim 4, wherein the first and second shafts are fitted in the frame through linear ball bearings.

6. The handling apparatus of claim 5, wherein the first and second shafts are rotatably hinged to the first and second coupling portions formed on the base.

7. The handling apparatus of claim 5, wherein the second coupling portion is formed at a center portion of the base.

8. The handling apparatus of claim 5, wherein the second shaft has a slot formed at the other end coupled to the second coupling portion and is hinged to the second coupling portion through the slot.

9. The handling apparatus of claim 4, wherein the damping unit includes:
 a first spring disposed on the first shaft of the sliding unit; and
 a second spring disposed on the second shaft of the sliding unit.

10. The handling apparatus of claim 9, wherein the first and second springs are held around the first and second shafts, respectively, by upper and lower spring seats.

11. The handling apparatus of claim 10, wherein the first and second springs have different spring constants.

12. The handling apparatus of claim 4, wherein the electromagnet unit is declined toward the first shaft.

13. A handling apparatus for a moving part, comprising:
 a frame connected with a separate carrying unit;
 an electromagnet unit disposed ahead of the frame and coming in contact with the moving part;
 a sliding unit disposed between the frame and the electromagnet unit and sliding the electromagnet unit forward/backward; and
 a damping unit disposed on the sliding unit and absorbing shock due to contact with the moving part,
 wherein the electromagnet unit includes:
  a mounting bracket having an electromagnet with a shock-absorbing member around an outer side of the electromagnet;
  a base mounted with the mounting bracket and connected with the sliding unit; and
  a rotating unit disposed on both sides of the base and connected with the base to enable the mounting bracket to rotate.

14. The handling apparatus of claim 13, wherein the sliding unit includes:
 a first shaft that has one end fitted in the frame and the other end coupled to a first coupling portion formed on the base; and
 a second shaft that is spaced apart from the first shaft and has one end fitted in the frame and the other end coupled to a second coupling portion formed on the base, wherein
 the first and second shafts are fitted in the frame through linear ball bearings.

15. The handling apparatus of claim 14, wherein:
- the first and second shafts are rotatably hinged to first and second coupling portions protruding on the base toward the frame;
- the second shaft is hinged to the second coupling portion through a slot formed at the other end coupled to the second coupling portion; and
- the second coupling portion is formed at a center portion of the base.

16. The handling apparatus of claim 14, wherein the damping unit includes:
- a first spring disposed on the first shaft of the sliding unit; and
- a second spring disposed on the second shaft of the sliding unit, wherein
- the first and second springs are held around the first and second shafts, respectively, by upper and lower spring seats and have different spring constants.

17. The handling apparatus of claim 14, wherein the electromagnet unit is declined toward the first shaft.

* * * * *